US012793905B2

(12) United States Patent
Ashimine et al.

(10) Patent No.: US 12,793,905 B2
(45) Date of Patent: Nov. 10, 2026

(54) ELECTRONIC COMPONENT WITH SEALING BODY FOR SUPPRESSING MOISTURE ENTRY

(71) Applicant: Murata Manufacturing Co., Ltd., Nagaokakyo (JP)

(72) Inventors: Tomoyuki Ashimine, Nagaokakyo (JP); Satoshi Shindo, Nagaokakyo (JP); Koshi Himeda, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 95 days.

(21) Appl. No.: 18/820,634

(22) Filed: Aug. 30, 2024

(65) Prior Publication Data

US 2024/0420899 A1 Dec. 19, 2024

Related U.S. Application Data

(63) Continuation of application No. PCT/JP2023/008978, filed on Mar. 9, 2023.

(30) Foreign Application Priority Data

Mar. 16, 2022 (JP) ................................ 2022-041384

(51) Int. Cl.
*H01G 9/10* (2006.01)
*H01G 9/012* (2006.01)
(Continued)

(52) U.S. Cl.
CPC ............... *H01G 9/10* (2013.01); *H01G 9/012* (2013.01); *H01G 9/025* (2013.01); *H01G 2/10* (2013.01)

(58) Field of Classification Search
CPC ............... H01G 9/10; H01G 9/08; H01G 2/10
See application file for complete search history.

(56) References Cited

U.S. PATENT DOCUMENTS 9,526,181 B2 12/2016 Kozuki et al.
11,870,013 B2 1/2024 Gindele et al.
(Continued)

FOREIGN PATENT DOCUMENTS

JP 2010-153691 A 7/2010
JP 2010-166018 A 7/2010
(Continued)

OTHER PUBLICATIONS

International Search Report received for PCT Patent Application No. PCT/JP2023/008978, mailed on May 23, 2023, 2 pages (English Translation Only).

*Primary Examiner* — Eric W Thomas
(74) *Attorney, Agent, or Firm* — ArentFox Schiff LLP

(57) ABSTRACT

An electronic component that includes: a sealing body having a first plate, a cover part spaced form the first plate, and a sealing metal layer; a functional part spaced from the first plate and in an airtight internal space of the sealing body; a filling resin part filling a space between the sealing body and the functional part; and a via conductor in a first through hole extending through the first plate and in a second through hole extending through the filling resin part and communicating with the first through hole, the via conductor being electrically connected to a pair of electrodes of the functional part. A water vapor transmission rate of the cover part is less than or equal to one-tenth of a water vapor transmission rate of the filling resin part having the same film thickness, or the cover part is made of glass or metal.

23 Claims, 5 Drawing Sheets

(51) Int. Cl.
*H01G 9/025* (2006.01)
*H01G 2/10* (2006.01)

(56) References Cited

U.S. PATENT DOCUMENTS

| | | | | |
|---|---|---|---|---|
| 2014/0177131 | A1* | 6/2014 | Miura | H01G 2/103 361/303 |
| 2015/0116971 | A1 | 4/2015 | Kozuki et al. | |
| 2020/0294718 | A1* | 9/2020 | Majima | C08J 5/18 |
| 2021/0384384 | A1 | 12/2021 | Gindele et al. | |

FOREIGN PATENT DOCUMENTS

| | | | |
|---|---|---|---|
| JP | 2015-084385 | A | 4/2015 |
| JP | 2019-057633 | A | 4/2019 |
| JP | 2021-193731 | A | 12/2021 |
| JP | 2022-009156 | A | 1/2022 |

* cited by examiner

ELECTRONIC COMPONENT WITH SEALING BODY FOR SUPPRESSING MOISTURE ENTRY

CROSS REFERENCE TO RELATED APPLICATIONS

The present application is a continuation of International application No. PCT/JP2023/008978, filed Mar. 9, 2023, which claims priority to Japanese Patent Application No. 2022-041384, filed Mar. 16, 2022, the entire contents of each of which are incorporated herein by reference.

TECHNICAL FIELD

The present disclosure relates to an electronic component.

BACKGROUND ART

In an electronic component including a functional part that is sensitive to humidity, in order to protect the functional part from moisture under use environment, the functional part is sealed with a material, such as resin, metal, or glass.

Patent Document 1 discloses an opto-electronics module (1) including a support element (3), at least one opto-electronics element (2) that is attached on the support element (3), a cover (5) for the opto-electronics element (2), and a cavity (11). The cover (5) includes a frame (7) and a glass element (9, 90), the frame (7) completely surrounding the opto-electronics element (2) in a peripheral direction and being connected to the support element (3), the glass element (9, 90) allowing electromagnetic radiation to enter the cover (5) and/or allowing electromagnetic radiation to exit from the cover (5), being attached to the frame (7), and being positioned to essentially oppose the support element (3). The cavity (11) is formed at least partly in a volume defined by an inner surface of the cover (5) and a surface of the support element (3). The opto-electronics element (2) is disposed in the cavity (11) so as to be sealed in in an air-tight and/or autoclavable manner by the cover (5). The opto-electronics module (1) has a filling material (13) that at least partly fills the cavity (11). The opto-electronics module (1) is structured and formed so as to compensate for expansion of the volume of the filling material (13), and, in order to realize this, includes at least one first compensation volume (15) that is deformable.

Patent Document 1: Japanese Unexamined Patent Application Publication No. 2021-193731

SUMMARY OF THE DISCLOSURE

Patent Document 1 describes that in order to connect the cover (5) to the support element (3) for sealing in the opto-electronics element (2) in an air-tight and/or autoclavable manner, one of the following processes is performed, that is,

- laser welding, in which case, the support element (3) is preferably made of ceramic or metal, the frame (7) is preferably made of ceramic or metal, especially, a metal coated with glass,
- resistance welding,
- soldering by using metal solder, in which case, the support element (3) and the cover (5) each have a surface suitable for establishing a firm connection with the solder, preferably, a surface having a solder preform,
- soldering by using glass solder,
- by using the filling material (13), at least adhesion of the frame (7) and the glass element (9) to each other, adhesion of the frame (7) and the support element (3) to each other, or adhesion of the glass element (9) and the support element (3) to each other, and
- by using silicone, polymer, or a joining material differing from the filling material (13), at least adhesion of the frame (7) and the glass element (9) to each other, adhesion of the frame (7) and the support element (3) to each other, or adhesion of the glass element (9) and the support element (3) to each other.

However, in the opto-electronics module (1) described in Patent Document 1, moisture may enter a space between the frame (7) and the glass element (9) or a space between the frame (7) and the support element (3).

In particular, in an electronic component including a functional part that is sensitive to humidity, when the moisture that has entered reaches the functional part, functional loss or deterioration occurs due to the moisture that has entered.

The present disclosure has been made to solve the problems above, and it is an object of the present disclosure to provide an electronic component that is capable of suppressing entry of moisture into a functional part.

An electronic component of the present disclosure includes: a first glass plate having a first principal surface and a second principal surface that face each other in a thickness direction and a side surface that connects the first principal surface and the second principal surface to each other, a cover part spaced from the first glass plate and opposing the first principal surface of the first glass plate in the thickness direction, and a sealing metal layer directly connected to the first glass plate, and connecting together the first glass plate and the cover part so as to airtightly seal an internal space of the sealing body; a functional part spaced from the first plate and in the internal space of the sealing body, the functional part having a pair of electrodes; a filling resin part that fills a space between the sealing body and the functional part; and a via conductor in a first through hole extending through the first plate in the thickness direction and in a second through hole extending through the filling resin part in the thickness direction and communicating with the first through hole, the via conductor being electrically connected to the pair of electrodes of the functional part, wherein a water vapor transmission rate of the cover part is less than or equal to one-tenth of a water vapor transmission rate of the filling resin part having a same film thickness, or the cover part is made of glass or metal.

According to the present disclosure, it is possible to provide an electronic component that is capable of suppressing entry of moisture into a functional part.

DESCRIPTION OF THE PREFERRED EMBODIMENTS

An electronic component of the present disclosure is described below.

However, the present disclosure is not limited to the structures below, and is applicable by making changes as appropriate within a scope in which the spirit of the present disclosure is not changed. Note that the present disclosure includes combinations of two or more preferable individual structures of the present disclosure described below.

In the electronic component of the present disclosure, a surface of a filling resin part that seals a functional part is covered with a sealing body. A first plate, a cover part, and a sealing metal layer of the sealing body are made of a material that is less likely to pass moisture therethrough than the filling resin part, and as a result of providing the sealing metal layer by directly connecting the sealing metal layer to the first plate, it is possible to suppress entry of moisture into the functional part.

Note that it is possible to suppress entry of moisture into the functional part by also covering the entire surface of the filling resin part with a glass material. However, since a coefficient of linear expansion of the glass material is less than a coefficient of linear expansion of a resin material, when the filling resin part expands at a high temperature, a sealing structure may break due to thermal stress. In contrast, in the electronic component of the present disclosure, since part of the surface of the filling resin part is covered with the sealing metal layer, when the filling resin part thermally expands, the sealing metal layer also thermally expands, and thus it is possible to reduce thermal stress.

Further, in the electronic component of the present disclosure, it is possible to extend a wire to the outside from the functional part through, for example, a via conductor provided in a through hole extending through a glass plate and the filling resin part.

The figures below are schematic views, and the dimensional scale, the width-to-length ratio scale, and the like in the figures may differ from those of actual products.

Figure 1:
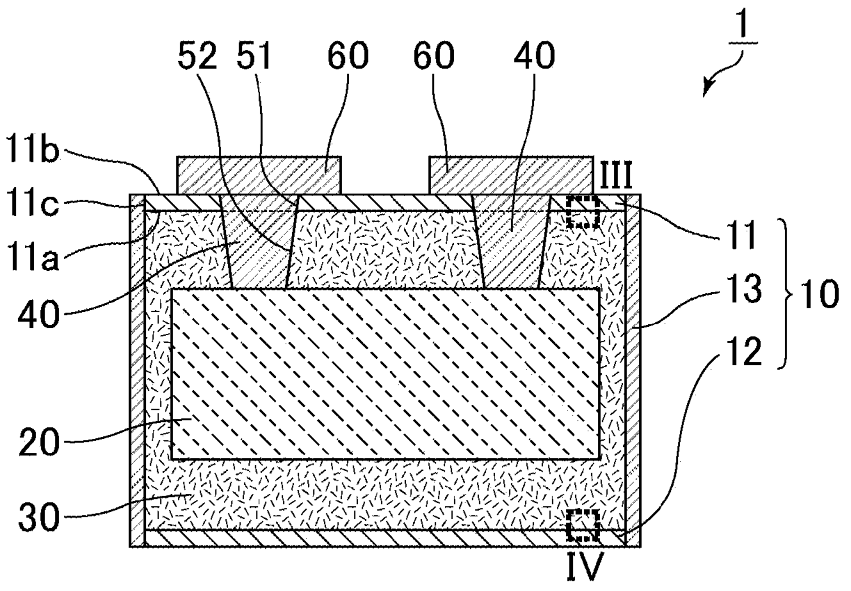
FIG. 1 is a sectional view schematically showing an example of an electronic component of the present disclosure.

FIG. 1 is a sectional view schematically showing an example of an electronic component of the present disclosure.

An electronic component 1 shown in FIG. 1 includes a sealing body 10, a functional part 20, a filling resin part 30, and a via conductor 40.

The sealing body 10 includes a first plate 11, a cover part 12, and a sealing metal layer 13.

The first plate 11 has a first principal surface 11*a* and a second principal surface 11*b* that face each other in a thickness direction, and a side surface 11*c* that connects the first principal surface 11*a* and the second principal surface 11*b* to each other.

The cover part 12 is spaced from the first plate 11 so as to oppose the first principal surface 11*a* of the first plate 11 in the thickness direction.

The sealing metal layer 13 together with the first plate 11 and the cover part 12 airtightly seals an internal space of the sealing body 10.

The functional part 20 is spaced from the first plate 11 in the internal space of the sealing body 10. At the functional part 20, an electrical potential is applied to a pair of electrodes (not shown).

The filling resin part 30 fills a space between the sealing body 10 and the functional part 20.

The via conductor 40 is provided in a first through hole 51 extending through the first plate 11 in the thickness direction and in a second through hole 52 extending through the filling resin part 30 in the thickness direction and communicating with the first through hole 51. The via conductor 40 is electrically connected to a pair of electrodes (for example, a pair of electrodes positioned on an upper surface side of the functional part 20) of the functional part 20.

In the example shown in FIG. 1, since a central axis of the first through hole 51 coincides with a central axis of the second through hole 52, the via conductor 40 is linearly provided.

The cross-sectional shape of the first through hole 51 and the cross-sectional shape of the second through hole 52 when viewed from the thickness direction are not particularly limited, and examples of the cross-sectional shapes include polygonal shapes, such as square shapes, circular shapes, and elliptical shapes. The first through hole 51 and the second through hole 52 may taper such that their hole diameters are decreased in the thickness direction toward the functional part 20. Note that "hole diameters" refer to the diameters when the cross-sectional shapes are circular shapes and refer to maximum lengths extending through the centers of cross sections when the cross-sectional shapes are other than circular shapes.

The via conductor 40 provided in the first through hole 51 and in the second through hole 52 is to be provided in at least an inner wall surface of the first through hole 51 and an inner wall surface of the second through hole 52. The inner wall surface of the first through hole 51 and the inner wall surface of the second through hole 52 are metalized with a low-resistance metal, such as copper, gold, or silver. Note that metalization of the via conductor 40 is not limited to a case in which only the inner wall surface of the first through hole 51 and the inner wall surface of the second through hole 52 are metalized, and may include a case in which the first through hole 51 and the second through hole 52 are filled with, for example, a metal or a composite material of a metal and a resin.

Although, in the example shown in FIG. 1, the via conductor 40 is shown as reaching the functional part 20, the via conductor 40 may be a through-hole conductor extending through the sealing body 10 in the thickness direction.

In addition to the via conductor 40 (may be a through-hole conductor) that is electrically connected to the pair of electrodes of the functional part 20, a through-hole conductor that is not electrically connected to the pair of electrodes of the functional part 20 may be provided. Such a through-hole conductor simply functions as a wire. The through-hole conductor that is not electrically connected to the pair of electrodes of the functional part 20 may be provided so as to extend through the sealing body 10 without extending through the functional part 20 in the thickness direction, or may be provided so as to extend through the sealing body 10 in such a manner as to extend through the functional part 20 in the thickness direction. Note that when a through-hole conductor that is provided so as to extend through the sealing body 10 in such a manner as to extend through the functional part 20 in the thickness direction is provided, an insulating material fills a space between a through hole that extends through the functional part 20 and the through-hole conductor.

As shown in FIG. 1, it is preferable that the second principal surface 11*b* of the first plate 11 be provided with a wire 60 that is electrically connected to the via conductor 40. Of portions of the wire 60, a portion that is connected to the via conductor 40 may be a land.

The wire 60 is made of, for example, a low-resistance metal, such as copper, gold, or silver, as a main constituent. The first plate 11 is a glass plate.

When a water vapor transmission rate of the cover part 12 is compared with a water vapor transmission rate of the filling resin part 30 having the same film thickness, the water vapor transmission rate of the cover part 12 is less than or equal to one-tenth of the water vapor transmission rate of the filling resin part 30 having the same film thickness.

The water vapor transmission rate (WVTR) can be measured by, for example, JIS K 7129 "Plastics—Film and sheeting—Determination of water vapor transmission rate (gas chromatography)". When the water vapor transmission rates of the cover part 12 and the filling resin part 30 having the same film thicknesses are compared, the water vapor transmission rate of the cover part 12 is to be less than or equal to one-tenth of the water vapor transmission rate of the filling resin part 30.

On the other hand, when, for example, the water vapor transmission rate of the cover part 12 is compared with the water vapor transmission rate of the filling resin part 30 having the same film thickness, the water vapor transmission rate of the cover part 12 is greater than or equal to $1/10^{10}$ ($1/10{,}000{,}000{,}000$) of the water vapor transmission rate of the filling resin part 30 having the same film thickness.

The cover part 12 is made of, for example, glass or metal.

When the cover part 12 is made of glass, the cover part 12 is, for example, a glass plate. The glass of which the cover part 12 is made may be the same as or different from the glass of which the first plate 11 is made.

When the cover part 12 is a glass plate, although not shown in FIG. 1, similarly to the first plate 11, the cover part 12 may be provided with a via conductor (may be a through-hole conductor). In this case, the via conductor that is provided in the cover part 12 is provided in a first through hole extending through the cover part 12 in the thickness direction and in a second through hole extending through the filling resin part 30 in the thickness direction and communicating with the first through hole. The via conductor is electrically connected to a pair of electrodes (for example, a pair of electrodes positioned on a lower surface side of the functional part 20) of the functional part 20. Further, it is preferable that a principal surface of the cover part 12 on a side opposite to the filling resin part 30 be provided with a wire that is electrically connected to a via conductor. Of portions of the wire, a portion that is connected to the via conductor may be a land.

When the cover part 12 is made of metal, the cover part 12 has, for example, the same structure as the sealing metal layer 13. The metal of which the cover part 12 is made may be the same as or different from the metal of which the sealing metal layer 13 is made.

The sealing metal layer 13 is provided by being directly connected to the first plate 11. In this case, it is preferable that the sealing metal layer 13 be directly adhered to the first plate 11.

It is preferable that, as shown in FIG. 1, the sealing metal layer 13 be provided by being directly connected to the side surface 11*c* of the first plate 11. In this case, it is preferable that the sealing metal layer 13 be directly adhered to the side surface 11*c* of the first plate 11.

Further, it is preferable that the sealing metal layer 13 be provided by being directly connected to the cover part 12. In this case, it is preferable that the sealing metal layer 13 be directly adhered to the cover part 12.

It is preferable that, as shown in FIG. 1, the sealing metal layer 13 be provided by being directly connected to a side surface of the cover part 12. In this case, it is preferable that the sealing metal layer 13 be directly adhered to the side surface of the cover part 12.

The sealing metal layer 13 includes, for example, a foundation layer and a plating layer, from a side of the filling resin part 30. The foundation layer may include one layer or two or more layers. The plating layer may include one layer or two or more layers.

The foundation layer is formed by, for example, sputtering or electroless plating. When the foundation layer is formed by sputtering, the foundation layer includes, for example, a close-contact layer and a power-supply layer, from the side of the filling resin part 30.

The plating layer is formed by, for example, electrolytic plating.

The filling resin part 30 is made of an insulating resin. Examples of the resin of which the filling resin part 30 is made include insulating resins, such as epoxy resin and phenol resin. Further, it is preferable that the filling resin part 30 include a filler. Examples of the filler included in the filling resin part 30 include inorganic fillers, such as silica particles, alumina particles, and metal particles.

The filling resin part 30 may include only one resin layer, or may include two or more resin layers that are laminated in the thickness direction. When the filling resin part 30 includes two or more resin layers, the materials of which the respective resin layers are made may be the same as or different from each other.

Figure 2:
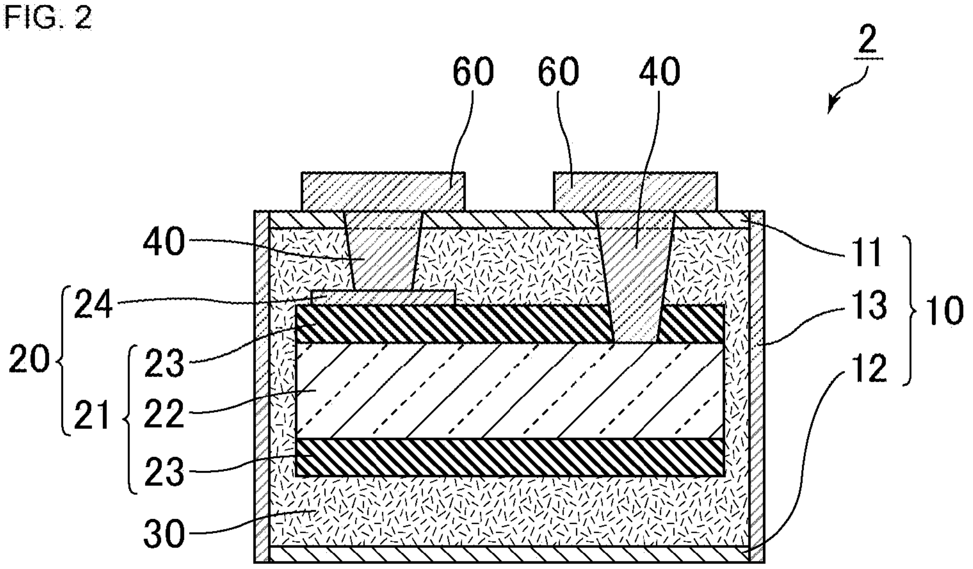
FIG. 2 is a sectional view schematically showing an example of an electronic component in which a functional part is a capacitor.

FIG. 2 is a sectional view schematically showing an example of an electronic component in which a functional part is a capacitor.

In an electronic component 2 shown in FIG. 2, a functional part 20 includes a positive electrode plate 21 made of metal. For example, the positive electrode plate 21 includes a core portion 22 made of a valve action metal. It is preferable that the positive electrode plate 21 include a porous portion 23 provided on at least one of principal surfaces of the core portion 22. A surface of the porous portion 23 is provided with a dielectric layer (not shown), and a surface of the dielectric layer is provided with a negative electrode layer 24. Therefore, in the example shown in FIG. 2, the functional part 20 forms a capacitor such as a conductive polymer capacitor.

In FIG. 2, one of portions of a via conductor 40 is electrically connected to the core portion 22 of the positive electrode plate 21, and the other portion of the via conductor 40 is electrically connected to the negative electrode layer 24. Therefore, the core portion 22 of the positive electrode plate 21 and the negative electrode layer 24 correspond to "a pair of electrodes of the functional part 20".

As mentioned above, the via conductor 40 may be a through-hole conductor that extends through a sealing body

10 in a thickness direction. For example, the portion of the through-hole conductor that is electrically connected to the core portion 22 of the positive electrode plate 21 may be provided so as to extend through the sealing body 10 in such a manner as to extend through the functional part 20 in the thickness direction. In this case, the core portion 22 of the positive electrode plate 21 and the through-hole conductor are directly connected to each other.

When the functional part 20 forms a conductive polymer capacitor, the positive electrode plate 21 is made of a so-called valve action metal that performs a valve action. Examples of the valve action metal include single metals, such as aluminum, tantalum, niobium, titanium, and zirconium, and alloys including at least one type of these metals. Among these, it is preferable to use aluminum or an aluminum alloy.

The shape of the positive electrode plate 21 is preferably the shape of a flat plate and more preferably the shape of a foil. The positive electrode plate 21 is to include a porous portion 23 at at least one of the principal surfaces of the core portion 22, and may include porous portions 23 at two principal surfaces of the core portion 22. The porous portion 23 is preferably a porous layer formed at a surface of the core portion 22, and more preferably an etching layer.

The dielectric layer provided at a surface of the porous portion 23 is porous in a manner reflecting a surface state of the porous portion 23, and has a fine uneven surface shape. It is preferable that the dielectric layer be formed from an oxide film of the valve action metal. For example, when an aluminum foil is used as the positive electrode plate 21, it is possible to form the dielectric layer formed from an oxide film by subjecting to anodization (also called chemical conversion treatment) a surface of the aluminum foil in a water solution containing, for example, ammonium adipate.

The negative electrode layer 24 provided at a surface of the dielectric layer includes, for example, a solid electrolytic layer provided at the surface of the dielectric layer. It is preferable that the negative electrode layer 24 further include a conductive layer provided at a surface of the solid electrolytic layer.

Examples of a material of which the solid electrolytic layer is made include, for example, conductive polymers, such as polypyrroles, polythiophenes, and polyanilines. Among these, polythiophenes are preferably used, and poly(3,4-ethylenedioxythiophene) called PEDOT is particularly preferably used. The conductive polymers may include a dopant, such as polystyrene sulfonate (PSS). Note that it is preferable that the solid electrolytic layer include an inner layer that fills pores (recessed portions) of the dielectric layer and an outer layer that covers the dielectric layer.

The conductive layer includes at least one of a conductive resin layer and a metal layer. The conductive layer may include only a conductive resin layer or only a metal layer. It is preferable that the conductive layer cover the entire surface of the solid electrolytic layer.

The conductive resin layer may be, for example, a conductive adhesive layer including at least one type of conductive filler selected from the group consisting of, for example, a silver filler, a copper filler, a nickel filler, and a carbon filler.

Examples of the metal layer include a metal plating film and a metal foil. It is preferable that the metal layer be made of at least one type of metal selected from the group consisting of nickel, copper, and silver, and alloys whose main component is any one of these metals. Note that "main component" refers to an elemental component having the largest elemental weight ratio.

The conductive layer includes, for example, a carbon layer that is provided at a surface of a solid electrolytic layer and a copper layer that is provided at a surface of the carbon layer.

The carbon layer is provided for electrically and mechanically connecting the solid electrolytic layer and the copper layer to each other. It is possible to form the carbon layer in a predetermined region by coating the solid electrolytic layer with a carbon paste by a method, such as sponge transfer, screen printing, dispenser coating, or inkjet printing.

It is possible to form the copper layer in a predetermined region by coating the carbon layer with a copper paste by a method, such as sponge transfer, screen printing, spray coating, dispenser coating, or inkjet printing.

When the functional part 20 is a capacitor, it is possible to use, as the capacitor, a ceramic capacitor that uses barium titanate, or a thin-film capacitor that uses silicon nitride (SiN), silicon dioxide ($SiO_2$), or hydrogen fluoride (HF). However, from the viewpoint of making it possible to form a capacitor that is thinner and that has a relatively large area and the viewpoint of mechanical characteristics, such as the rigidity and the flexibility of the electronic component 2, the functional part 20 is preferably a capacitor whose base material is a metal, such as aluminum, and, more preferably, a conductive polymer capacitor whose base material is a metal, such as aluminum.

Note that, examples of the functional part 20 required to have moisture resistance include capacitors, such as a conductive polymer capacitor and a thin-film capacitor having a high dielectric constant, and batteries, such as an all solid-state battery and a lithium ion secondary battery (LIB).

Figure 3:
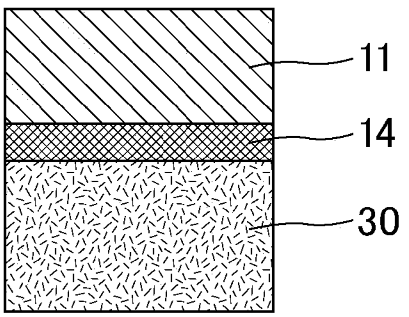
FIG. 3 is an enlarged view of a portion denoted by III in FIG. 1.

FIG. 3 is an enlarged view of a portion denoted by III in FIG. 1.

As shown in FIG. 3, it is preferable that a first adhesive layer 14 be provided between the filling resin part 30 and the first plate 11. The filling resin part 30 and the first plate 11 can more closely contact each other by the first adhesive layer 14.

The first adhesive layer 14 has electrical insulating properties and adherence properties. The first adhesive layer 14 is formed from, for example, an epoxy based adhesive sheet, an epoxy based adhesive agent, an acrylic adhesive sheet, or an acrylic adhesive agent. The first adhesive layer 14 may be provided entirely or partly between a surface of the filling resin part 30 and a surface of the first plate 11.

It is preferable that the Young's modulus of the first adhesive layer 14 be lower than the Young's modulus of the first plate 11 and lower than the Young's modulus of the filling resin part 30. In this case, when the filling resin part 30 thermally expands, the first adhesive layer 14 is capable of absorbing the thermal expansion of the filling resin part 30.

The Young's modulus of the first adhesive layer 14 is, for example, 0.005 GPa to 2.9 GPa. The Young's modulus of the first plate 11 is, for example, 50 GPa to 90 GPa. The Young's modulus of the filling resin part 30 is, for example, 3 GPa to 50 GPa.

It is possible to measure the Young's modulus by, for example, a static test method (bending test).

It is preferable that the thickness of the first plate 11 be less than or equal to 200 μm. In this case, it is possible to allow thermal expansion of the filling resin part 30 by deformation of the first plate 11.

On the other hand, from the viewpoint of ensuring mechanical strength of the first plate 11, it is preferable that the thickness of the first plate 11 be greater than or equal to 5 μm.

Note that the thickness of the first plate 11 means the dimension of the first plate 11 in the thickness direction of the first plate 11.

When the thickness of the first plate 11 is less than or equal to 200 μm, the thickness of the sealing metal layer 13 is preferably less than or equal to 4 times the thickness of the first plate 11, and more preferably less than the thickness of the first plate 11. In this case, it is possible to allow thermal expansion of the filling resin part 30 by deformation of both the first plate 11 and the sealing metal layer 13.

On the other hand, from the viewpoint of suppressing entry of moisture into the functional part 20, it is preferable that the thickness of the sealing metal layer 13 be greater than or equal to 10 μm.

Note that the thickness of the sealing metal layer 13 means the dimension of the sealing metal layer 13 in a direction parallel to a principal surface of the first plate 11.

When the thickness of the first plate 11 is less than or equal to 200 μm, the cover part 12 is plate-shaped and the thickness of the cover part 12 is preferably less than or equal to 200 μm. In this case, it is possible to allow thermal expansion of the filling resin part 30 by deformation of the cover part 12.

On the other hand, from the viewpoint of ensuring mechanical strength of the cover part 12, it is preferable that the thickness of the cover part 12 be greater than or equal to 5 μm. Note that the thickness of the cover part 12 may be the same as or different from the thickness of the first plate 11.

Note that the thickness of the cover part 12 means the dimension of the cover part 12 in the thickness direction of the first plate 11.

Figure 4:
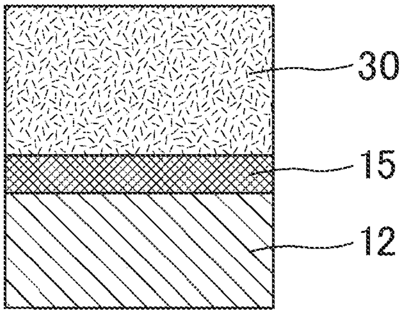
FIG. 4 is an enlarged view of a portion denoted by IV in FIG. 1.

FIG. 4 is an enlarged view of a portion denoted by IV in FIG. 1.

For example, when the cover part 12 is a glass plate, as shown in FIG. 4, it is preferable that a second adhesive layer 15 be provided between the filling resin part 30 and the cover part 12. The filling resin part 30 and the cover part 12 can more closely contact each other by the second adhesive layer 15.

The second adhesive layer 15 has electrical insulating properties and adherence properties. The second adhesive layer 15 is formed from, for example, an epoxy based adhesive sheet, an epoxy based adhesive agent, an acrylic adhesive sheet, or an acrylic adhesive agent. The second adhesive layer 15 may be provided entirely or partly between a surface of the filling resin part 30 and a surface of the cover part 12. The material of which the second adhesive layer 15 is made may be the same as or different from the material of which the first adhesive layer 14 is made.

It is preferable that the Young's modulus of the second adhesive layer 15 be lower than the Young's modulus of the cover part 12 and lower than the Young's modulus of the filling resin part 30. In this case, when the filling resin part 30 thermally expands, the second adhesive layer 15 is capable of absorbing the thermal expansion of the filling resin part 30.

The Young's modulus of the second adhesive layer 15 is, for example, 0.005 GPa to 2.9 GPa. The Young's modulus of the second adhesive layer 15 may be the same as or different from the Young's modulus of the first adhesive layer 14. When the cover part 12 is a glass plate, the Young's modulus of the cover part 12 is, for example, 50 GPa to 90 GPa. When the cover part 12 is a glass plate, the Young's modulus of the cover part 12 may be the same as or different from the Young's modulus of the first plate 11.

Figure 5:
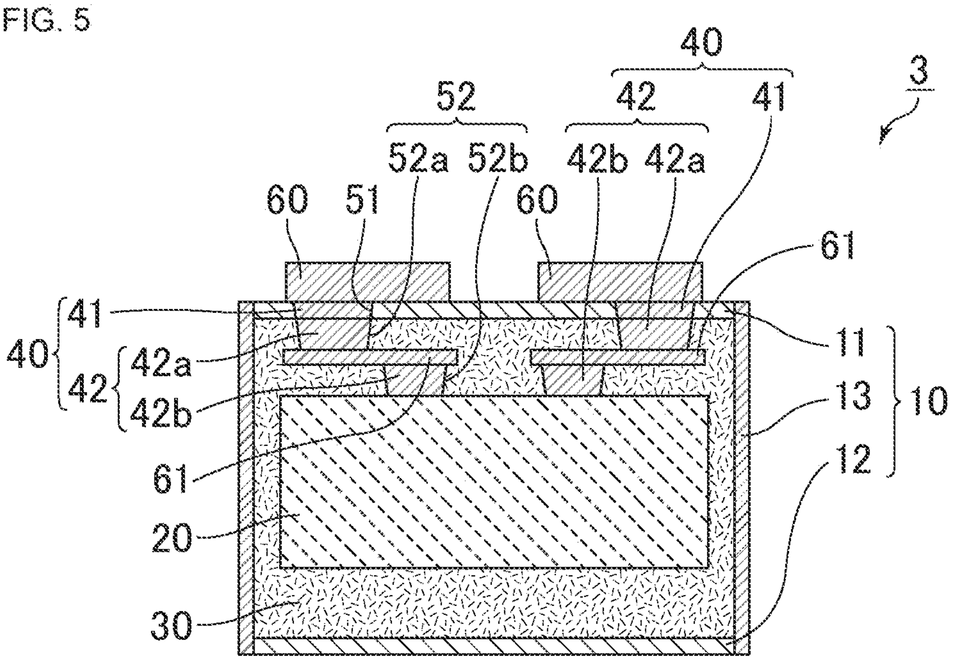
FIG. 5 is a sectional view schematically showing an example of an electronic component in which a central axis of a first through hole does not coincide with a central axis of a second through hole.

FIG. 5 is a sectional view schematically showing an example of an electronic component in which a central axis of a first through hole does not coincide with a central axis of a second through hole.

In an electronic component 3 shown in FIG. 5, unlike the electronic component 1 shown in FIG. 1, a central axis of a first through hole 51 does not coincide with a central axis of a second through hole 52. In the example shown in FIG. 5, the second through hole 52 includes a second through hole 52*a* on a side of a first plate 11 and a second through hole 52*b* on a side of a functional part 20. The central axis of the first through hole 51 does not coincide with a central axis of the second through hole 52*b* on the side of the functional part 20. A central axis of the second through hole 52*a* on the side of the first plate 11 does not coincide with the central axis of the second through hole 52*b* on the side of the functional part 20. The central axis of the first through hole 51 may coincide with the central axis of the second through hole 52*a* on the side of the first plate 11, or need not coincide with the second through hole 52*a* on the side of the first plate 11.

Specifically, a via conductor 40 includes a first via conductor 41 that is provided in the first through hole 51 and a second via conductor 42 that is provided in the second through hole 52. A central axis of the first via conductor 41 is positioned laterally with respect to a central axis of the second via conductor 42. The first via conductor 41 and the second via conductor 42 are electrically connected to each other by a wire 61 provided at a filling resin part 30. In the example shown in FIG. 5, the second via conductor 42 includes a second via conductor 42*a* that is provided in the second through hole 52*a* on the side of the first plate 11 and a second via conductor 42*b* that is provided in the second through hole 52*b* on the side of the functional part 20. A central axis of the first via conductor 41 is positioned laterally with respect to a central axis of the second via conductor 42*b* on the side of the functional part 20. A central axis of the second via conductor 42*a* on the side of the first plate 11 is positioned laterally with respect to the central axis of the second via conductor 42*b* on the side of the functional part 20. The central axis of the first via conductor 41 may coincide with the central axis of the second via conductor 42*a* on the side of the first plate 11, or may be positioned laterally with respect to the central axis of the second via conductor 42*a* on the side of the first plate 11.

As with the electronic component 3 shown in FIG. 5, by dividing the via conductor 40 into the first via conductor 41 and the second via conductor 42 and disposing the first via conductor 41 and the second via conductor 42 so as not to be linearly disposed in parallel, it is possible to reduce stress applied to the first plate 11 when the via conductor 40 thermally expands in the thickness direction.

From the viewpoint of reducing stress that is applied to the first plate 11, it is preferable that, when viewed from the thickness direction, there exists a portion where the first via conductor 41 does not overlap the second via conductor 42. In the example shown in FIG. 5, when viewed from the thickness direction, the first via conductor 41 does not overlap the second via conductor 42*b* on the side of the functional part 20. When viewed in the thickness direction, the first via conductor 41 may overlap or need not overlap the second via conductor 42*a* on the side of the first plate 11. When viewed from the thickness direction, the second via conductor 42*a* on the side of the first plate 11 may or need not overlap the second via conductor 42*b* on the side of the functional part 20.

A wire 61 is to be disposed between the first plate 11 and the functional part 20. Although, in the example shown in FIG. 5, the wire 61 is spaced from the first plate 11 and the functional part 20, for example, the wire 61 may be disposed so as to contact the first plate 11. When the wire 61 is disposed so as to contact the first plate 11, the second via conductor 42 does not include the second via conductor 42*a* on the side of the first plate 11 and only includes the second via conductor 42*b* on the side of the functional part 20.

The wire 61 between the first via conductor 41 and the second via conductor 42 is made of, for example, a low-resistance metal, such as copper, gold, or silver, as a main constituent. The material of which the wire 61 is made may be the same as or different from the material of which the wire 60 is made.

Considering that the wire 61 itself thermally expands in the thickness direction, it is preferable that the thickness of the wire 61 be 0.5 μm to 40 μm.

As with the electronic component 1 shown in FIG. 1, the electronic component 2 shown in FIG. 2, and the electronic component 3 shown in FIG. 5, it is preferable that, in the filling resin part 30, the second through hole 52 be provided in only a region between the first plate 11 and the functional part 20. Further, it is preferable that, when viewed from the thickness direction, the first through hole 51 be provided in only a region that overlaps the functional part 20. In this case, since the electronic components 1, 2, and 3 are not widened in a width direction, it is possible to reduce the sizes of the electronic components 1, 2, and 3.

As with the electronic component 1 shown in FIG. 1, the electronic component 2 shown in FIG. 2, and the electronic component 3 shown in FIG. 5, it is preferable that, in the filling resin part 30, the thickness between the first plate 11 and the functional part 20 be less than the thickness of the functional part 20. Further, it is preferable that, in the filling resin part 30, the thickness between the cover part 12 and the functional part 20 be less than the thickness of the functional part 20. In this case, since the electronic components 1, 2, and 3 are not widened in the thickness direction, it is possible to reduce the sizes of the electronic components 1, 2, and 3.

As with the electronic component 1 shown in FIG. 1, the electronic component 2 shown in FIG. 2, and the electronic component 3 shown in FIG. 5, it is preferable that when the second principal surface 11*b* of the first plate 11 is provided with the wire 60, the flatness of the second principal surface 11*b* of the first plate 11 be less than or equal to 30 nm in terms of arithmetic mean roughness. Since the first plate 11 is a glass plate, its flatness is high. Therefore, it is possible to form the wire 60 to be a fine wire.

On the other hand, it is preferable that the flatness of the second principal surface 11*b* of the first plate 11 be greater than or equal to 0.1 nm in terms of arithmetic mean roughness.

Note that the arithmetic mean roughness (Ra) refers to a surface roughness that is measured on the basis of JIS B 0601:2013.

Figure 6:
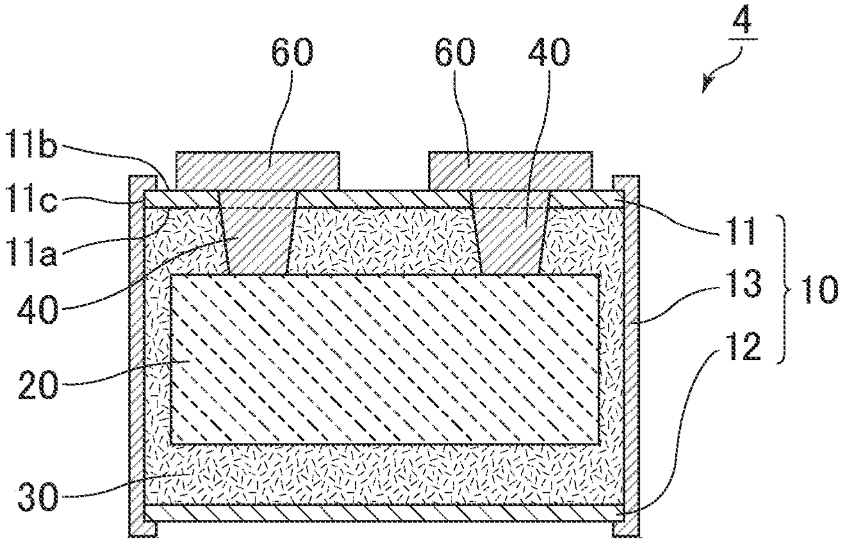
FIG. 6 is a sectional view schematically showing a first modification of the electronic component shown in FIG. 1.

FIG. 6 is a sectional view schematically showing a first modification of the electronic component shown in FIG. 1.

As with an electronic component 4 shown in FIG. 6, the sealing metal layer 13 may be provided from the side surface 11*c* of the first plate 11 up to the second principal surface 11*b* of the first plate 11. By not only connecting the sealing metal layer 13 to the side surface 11*c* of the first plate 11, but also connecting the sealing metal layer 13 to the second principal surface 11*b* of the first plate 11, the connection area of the sealing metal layer 13 is increased and thus it is possible to allow thermal expansion of the filling resin part 30.

Similarly, the sealing metal layer 13 may be provided from a side surface of the cover part 12 up to a principal surface of the cover part 12 on a side opposite to the filling resin part 30.

Figure 7:
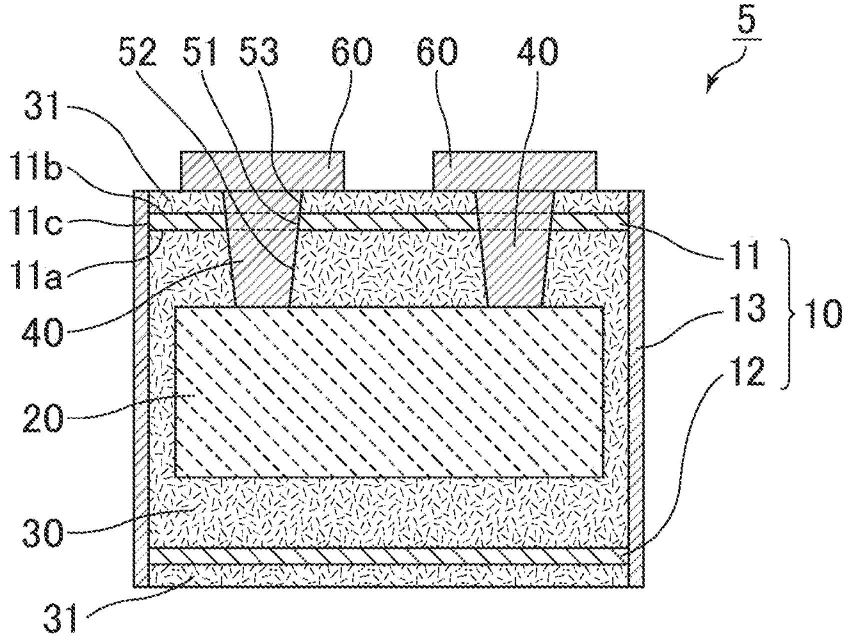
FIG. 7 is a sectional view schematically showing a second modification of the electronic component shown in FIG. 1.

FIG. 7 is a sectional view schematically showing a second modification of the electronic component shown in FIG. 1.

As with an electronic component 5 shown in FIG. 7, the second principal surface 11*b* of the first plate 11 may be provided with an outer-side resin part 31.

As with the filling resin part 30, the outer-side resin part 31 is made of an insulating resin. The outer-side resin part 31 may be made of a material that is the same as or different from the material of which the filling resin part 30 is made.

The outer-side resin part 31 may include only one resin layer, or may include two or more layers that are laminated in the thickness direction. When the outer-side resin part 31 includes two or more resin layers, the materials of which the respective resin layers are made may be the same as or different from each other.

It is preferable that the thickness of the outer-side resin part 31 be less than the thickness of the filling resin part 30 between the first plate 11 and the functional part 20. In this case, since the electronic component 5 is not widened in the thickness direction, it is possible to reduce the size of the electronic component 5.

It is preferable that, in the outer-side resin part 31, the surface roughness of its surface on a side opposite to its surface that contacts the first plate 11 be greater than the surface roughness of its surface that contacts the first plate 11. The electronic component 5 is embedded in, for example, a substrate of an HPC (high performance computer) or the like. Therefore, by making high the surface roughness of an outer surface of the outer-side resin part 31, it is possible to more closely contact the outer-side resin part 31 and the substrate to each other.

Specifically, it is preferable that, in the outer-side resin part 31, the surface roughness of its surface on the side opposite to its surface that contacts the first plate 11 be 300 nm to 3000 nm in terms of arithmetic mean roughness.

As shown in FIG. 7, in the outer-side resin part 31, its surface on the side opposite to its surface that contacts the first plate 11 is preferably provided with a wire 60 that is electrically connected to the via conductor 40. Of portions of the wire 60, a portion that is connected to the via conductor 40 may be a land.

When, in the outer-side resin part 31, its surface on the side opposite to its surface that contacts the first plate 11 is provided with the wire 60, in the surface of the outer-side resin part 31 on the side opposite to its surface that contacts the first plate 11, the surface roughness of a surface where the wire 60 is not provided may be greater than the surface roughness of a surface that contacts the wire 60.

When the second principal surface 11*b* of the first plate 11 is provided with the outer-side resin part 31, the via conductor 40 is provided in a first through hole 51 extending through the first plate 11 in the thickness direction, in a second through hole 52 extending through the filling resin part 30 in the thickness direction and communicating with the first through hole 51, and in a third through hole 53 extending through the outer-side resin part 31 in the thickness direction and communicating with the first through hole 51. The via conductor 40 is electrically connected to a pair of electrodes (for example, a pair of electrodes positioned on an upper surface side of the functional part 20) of the functional part 20.

In the example shown in FIG. 7, since a central axis of the first through hole 51 coincides with a central axis of the second through hole 52, and the central axis of the second through hole 52 coincides with a central axis of the third through hole 53, the via conductor 40 is linearly provided.

Unlike the example shown in FIG. 7, the central axis of the first through hole 51 need not coincide with the central axis of the second through hole 52, and the central axis of the second through hole 52 need not coincide with the central axis of the third through hole 53. In this case, portions of the via conductor that are provided in the through holes whose central axes do not coincide with each other are electrically connected to each other by a wire 61 (see FIG. 5) provided at the filling resin part 30. It is preferable that, when viewed in the thickness direction, there exist a portion where portions of the via conductor that are provided in the through holes whose central axes do not coincide with each other do not overlap each other.

As with the electronic component 5 shown in FIG. 7, it is preferable that, in the filling resin part 30, the second through hole 52 be disposed in only a region between the first plate 11 and the functional part 20. Further, it is preferable that, when viewed in the thickness direction, at least one of the first through hole 51 and the third through hole 53 be provided in only a region that overlaps the functional part 20, and it is more preferable that, when viewed in the thickness direction, both of the first through hole 51 and the third through hole 53 be provided in only a region that overlaps the functional part 20. In this case, since the electronic component 5 is not widened in a width direction, it is possible to reduce the size of the electronic part 5.

Although not shown in FIG. 7, as in FIG. 3, it is preferable that an adhesive layer be provided between the filling resin part 30 and the first plate 11 and that an adhesive layer be provided between the outer-side resin part 31 and the first plate 11.

As with the first plate 11, a principal surface of the cover part 12 on a side opposite to the filling resin part 30 may be provided with an outer-side resin part 31.

The outer-side resin part 31 that is provided on the principal surface of the cover part 12 on the side opposite to the filling resin part 30 may be made of a material that is the same as or different from the material of which the outer-side resin part 31 that is provided on the second principal surface 11*b* of the first plate 11 is made.

The outer-side resin part 31 that is provided on the principal surface of the cover part 12 on the side opposite to the filling resin part 30 may include only one resin layer, or may include two or more resin layers that are laminated in the thickness direction. When the outer-side resin part 31 includes two or more resin layers, the materials of which the respective resin layers are made may be the same as or different from each other.

It is preferable that the thickness of the outer-side resin part 31 that is provided on the principal surface of the cover part 12 on the side opposite to the filling resin part 30 be less than the thickness of the filling resin part 30 between the cover part 12 and the functional part 20. In this case, since the electronic component 5 is not widened in the thickness direction, it is possible to reduce the size of the electronic component 5. The thickness of the outer-side resin part 31 that is provided on the principal surface of the cover part 12 on the side opposite to the filling resin part 30 may the same as or different from the thickness of the outer-side resin part 31 that is provided on the second principal surface 11*b* of the first plate 11.

In the outer-side resin part 31 that is provided on the principal surface of the cover part 12 on the side opposite to the filling resin part 30, it is preferable that the surface roughness of its surface on a side opposite to its surface that contacts the cover part 12 be greater than the surface roughness of its surface that contacts the cover part 12. The surface roughness of the outer-side resin part 31 that is provided on the principal surface of the cover part 12 on the side opposite to the filling resin part 30 may be the same as or different from the surface roughness of the outer-side resin part 31 that is provided on the second principal surface 11*b* of the first plate 11.

Specifically, it is preferable that, in the outer-side resin part 31, the surface roughness of its surface on the side opposite to its surface that contacts the cover part 12 be 300 nm to 3000 nm in terms of arithmetic mean roughness.

When the cover part 12 is a glass plate, although not shown in FIG. 7, as with the first plate 11, the cover part 12 may be provided with a via conductor. In this case, the via conductor that is provided at the cover part 12 is provided in a first through hole extending through the cover part 12 in the thickness direction, in a second through hole extending through the filling resin part 30 in the thickness direction and communicating with the first through hole, and in a third through hole extending through the outer-side resin part 31 in the thickness direction and communicating with the first through hole. The via conductor is electrically connected to a pair of electrodes (for example, a pair of electrodes positioned on a lower surface side of the functional part 20) of the functional part 20. Further, it is preferable that, in the outer-side resin part 31 that is provided on the principal surface of the cover part 12 on the side opposite to the filling resin part 30, its surface on the side opposite to the surface that contacts the cover part 12 be provided with a wire. Of portions of the wire, a portion that is connected to the via conductor may be a land.

When, in the outer-side resin part 31 that is provided on the principal surface of the cover part 12 on the side opposite to the filling resin part 30, its surface on the side opposite to its surface that contacts the cover part 12 is provided with the wire, in the surface of the outer-side resin part 31 on the side opposite to its surface that contacts the cover part 12, the surface roughness of a surface where the wire is not provided may be greater than the surface roughness of a surface that contacts the wire.

Although not shown in FIG. 7, as in FIG. 4, it is preferable that an adhesive layer be provided between the filling resin part 30 and the cover part 12 and that an adhesive layer be provided between the outer-side resin part 31 and the cover part 12.

Figure 8:
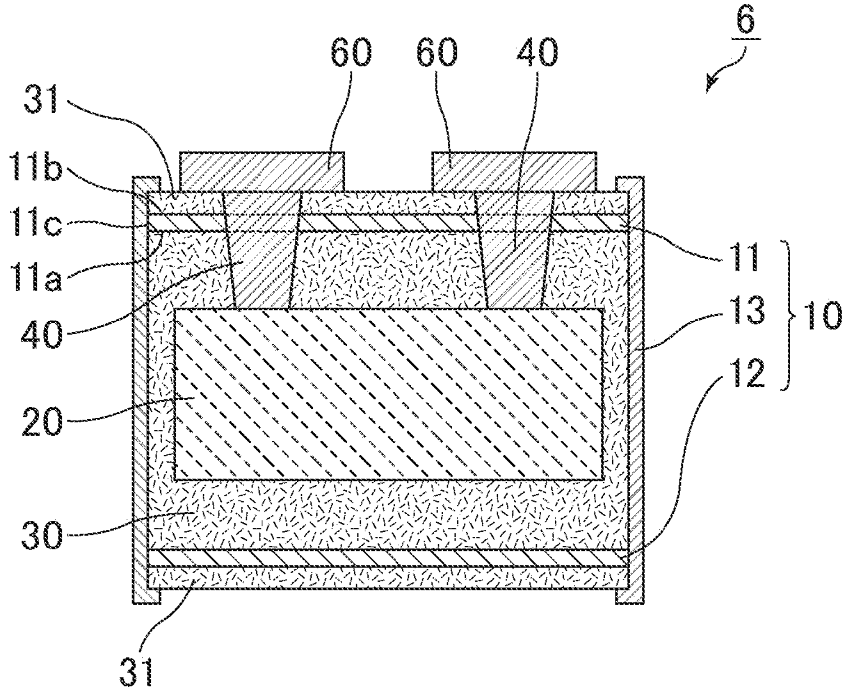
FIG. 8 is a sectional view schematically showing a modification of the electronic component shown in FIG. 7.

FIG. 8 is a sectional view schematically showing a modification of the electronic component shown in FIG. 7.

As with an electronic component 6 shown in FIG. 8, the sealing metal layer 13 may be provided from the side surface 11*c* of the first plate 11 up to the surface of the outer-side resin part 31 on the side opposite to its surface that contacts the first plate 11. By providing the sealing metal layer 13 up to an outer surface of the outer-side resin part 31, stress that is produced when the filling resin part 30 thermally expands can be dispersed up to the outer-side resin part 31.

When the principal surface of the cover part 12 on the side opposite to the filling resin part 30 is provided with the outer-side resin part 31, the sealing metal layer 13 may be provided from a side surface of the cover part 12 up to the surface of the outer-side resin part 31 on the side opposite to its surface that contacts the cover part 12.

Figure 9:
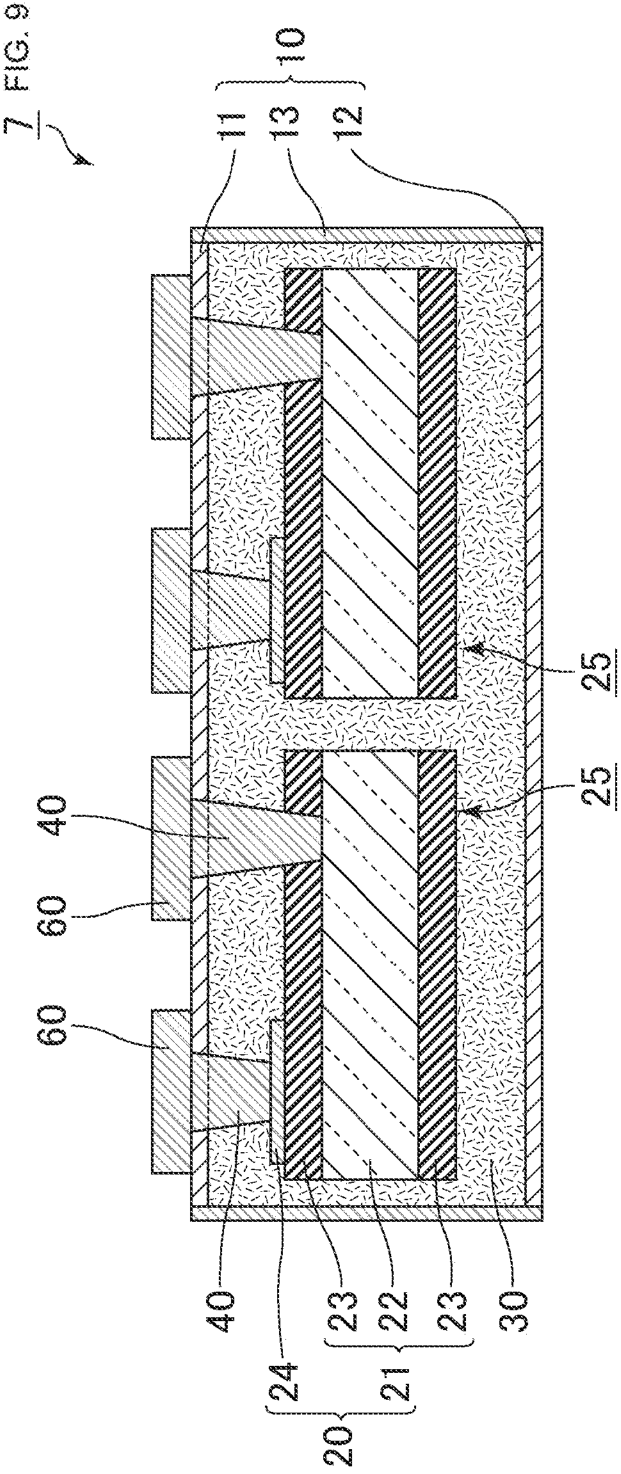
FIG. 9 is a sectional view schematically showing a modification of the electronic component shown in FIG. 2.

FIG. 9 is a sectional view schematically showing a modification of the electronic component shown in FIG. 2.

As with an electronic component 7 shown in FIG. 9, when the functional part 20 is a capacitor, the functional part 20 may include a plurality of capacitor elements 25.

In the example shown in FIG. 9, although the plurality of capacitor elements 25 are disposed in parallel on a plane, the plurality of capacitor elements 25 may be disposed so as to be laminated in the thickness direction, or both of them may be disposed by being combined.

When the functional part 20 includes the plurality of capacitor elements 25, a region including the plurality of capacitor elements 25 corresponds to the functional part 20. Therefore, even when a second through hole 52 is provided between the capacitor elements 25 that are laminated in the thickness direction, the location where the second through hole 52 is provided corresponds to "between the first plate 11 and the functional part 20".

The number of capacitor elements 25 is not particularly limited as long as the number of capacitor elements 25 is two or more. For example, the sizes and the shapes of the capacitor elements 25 may be the same, or, for example, the sizes and the shapes of some or all of the capacitor elements 25 may differ from each other.

Although it is preferable that the structures of the capacitor elements 25 be the same, there may be capacitor elements 25 having different structures.

EXAMPLES

Examples for more specifically disclosing the electronic component of the present disclosure are given below. Note that the present disclosure is not limited to only these examples.

Figure 10:
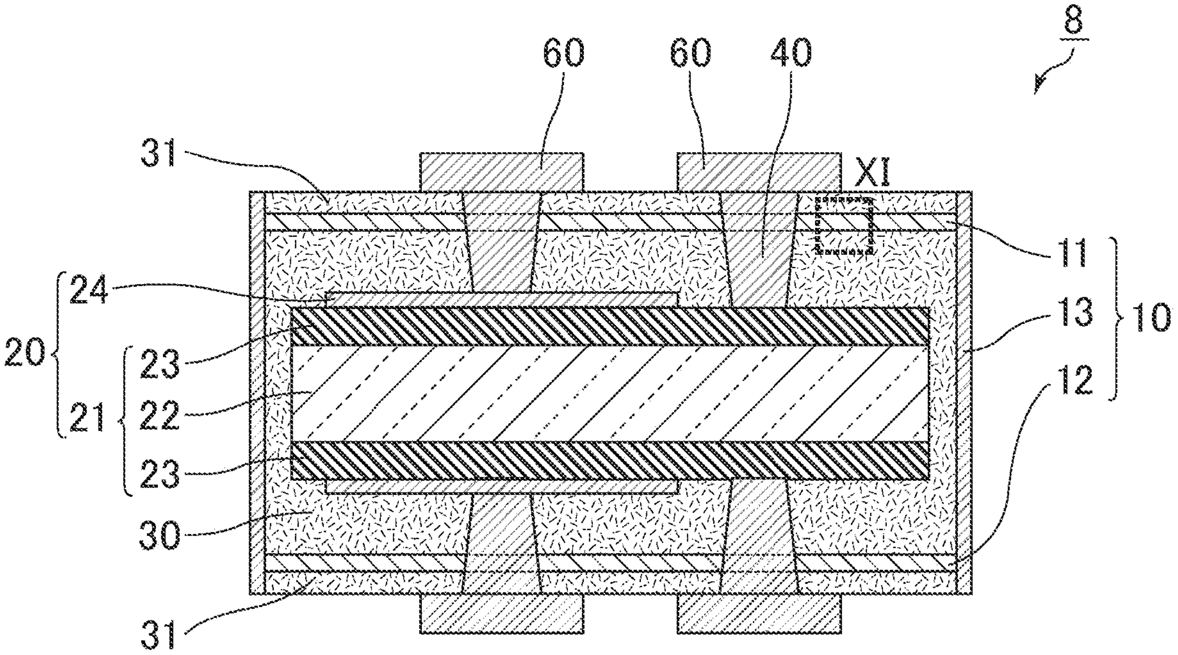
FIG. 10 is a sectional view schematically showing an electronic component according to an example.
Figure 11:
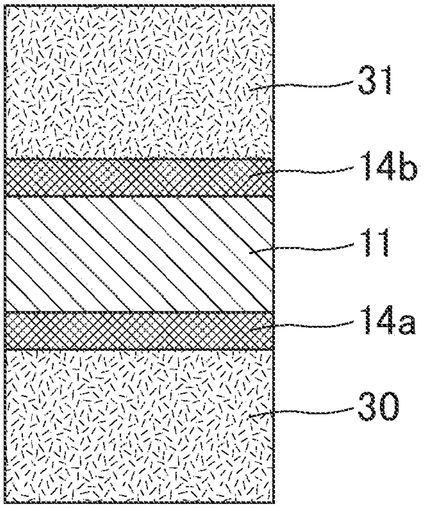
FIG. 11 is an enlarged view of a portion denoted by XI in FIG. 10.

FIG. 10 is a sectional view schematically showing an electronic component according to an example. FIG. 11 is an enlarged view of a portion denoted by XI in FIG. 10.

As a functional part 20, a capacitor element is prepared, the capacitor element including a positive electrode plate 21, a dielectric layer (not shown), and a negative electrode layer 24, the positive electrode 21 having porous portions 23 that are each provided on a corresponding one of two principal surfaces of a core portion 22 made of a valve action metal, the dielectric layer being provided at a surface of each porous portion 23, the negative electrode layer 24 being provided at a surface of the dielectric layer. The core portion 22 of the positive electrode plate 21 and the negative electrode layer 24 correspond to "a pair of electrodes of the functional part 20".

Lamination of a build-up film (for example, ABF (Ajinomoto Build-up Film) is performed from both the front and rear surfaces of the functional part 20, and a curing process is performed, to thereby form a filling resin part 30.

Separately, as a first plate 11 and a cover part 12, two glass plates (for example, G-Leaf (registered trademark) (manufactured by Nippon Electric Glass Co., Ltd., thickness: 50 μm)) are prepared.

After adhering an adhesive layer 14*a* (for example, a two-sided adhesive sheet) to one of principal surfaces of the first plate 11, the adhesive layer 14*a* is adhered to the filling resin part 30, and, after adhering an adhesive layer (for example, a two-sided adhesive sheet) to one of principal surfaces of the cover part 12, the adhesive layer is adhered to the filling resin part 30.

After adhering an adhesive layer 14*b* (for example, a two-sided adhesive sheet) to the other principal surface of the first plate 11 and adhering an adhesive layer (for example, a two-sided adhesive sheet) to the other principal surface of the cover part 12, a build-up film (for example, ABF (Ajinomoto Build-up Film)) is adhered to each of the adhesive layers, and a curing process is performed. As a result, outer-side resin parts 31 are formed.

By performing the above, a multilayer body in which the functional part 20 is disposed therein is formed.

By performing a two-step processing operation using a femtosecond green laser and a $CO_2$ laser, through holes each extending to the functional part 20 from a surface of a corresponding one of the outer-side resin parts 31 are formed. Specifically, each through hole is formed from the surface of the corresponding outer-side resin part 31 up to the first plate 11 or the cover part 12 by using the femtosecond green laser, and each through hole is formed from the first plate 11 or the cover part 12 up to the functional part 20 by using the $CO_2$ laser.

Patterning is performed on electrodes by electroless plating, photolithography, electrolytic plating, resist peeling, or electroless plating and etching. As a result, a via conductor 40 and a wire 60 are formed.

The front and rear surfaces of each outer-side resin part 31 are covered by a thermal release sheet.

Cutting with a dicing machine is performed to form individual portions.

A foundation layer of a sealing metal layer 13 is formed on a side surface of the multilayer body. For example, after forming a close-contact layer (Ti, Cr, or NiCr) having a thickness of 100 nm by sputtering, a power-supply layer (Cu) having a thickness of 1000 nm is formed. Alternatively, the power-supply layer (Cu) having a thickness of 1000 nm may be formed by electroless plating instead of sputtering.

The thermal release sheet is peeled from the multilayer body where the foundation layer of the sealing metal layer 13 has been formed.

A plating layer of the sealing metal layer 13 is formed on the side surface of the multilayer body from which the thermal release sheet has been peeled. For example, by performing electrolytic plating, from a side of the foundation layer, a plating layer having a Cu thickness of 20 μm/an Ni thickness of 5 μm, a plating layer having a Cu thickness of 20 μm/an Ni thickness of 5 μm/an Au thickness of 1 μm, or a plating layer having a Cu thickness of 20 μm/an Ni thickness of 5 μm/an Sn thickness of 2 μm is formed.

By performing the above, an electronic component 8 is obtained.

Note that when the via conductor 40 is a through-hole conductor, the through holes extending through the multilayer body can be formed by using a UV laser instead of by performing the two-step processing operation using a femtosecond green laser and a $CO_2$ laser.

The electronic component of the present disclosure is not limited to the embodiment above, and, with regard to, for example, the structure of the electronic component and manufacturing conditions of the electronic component, various applications and modifications are possible within the scope of the present disclosure.

REFERENCE SIGNS LIST

1, 2, 3, 4, 5, 6, 7, 8 electronic component
10 sealing body
11 first plate
11*a* first principal surface of first plate
11*b* second principal surface of first plate
11*c* side surface of first plate
12 cover part

13 sealing metal layer
14 first adhesive layer
14*a*, 14*b* adhesive layer
15 second adhesive layer
20 functional part
21 positive electrode plate
22 core portion
23 porous portion
24 negative electrode layer
25 capacitor element
30 filling resin part
31 outer-side resin part
40 via conductor
41 first via conductor
42, 42*a*, 42*b* second via conductor
51 first through hole
52, 52*a*, 52*b* second through hole
53 third through hole
60, 61 wire

The invention claimed is:

1. An electronic component comprising:

a sealing body that includes:

a first glass plate having a first principal surface and a second principal surface that face each other in a thickness direction and a side surface that connects the first principal surface and the second principal surface to each other;

a cover part spaced from the first glass plate and opposing the first principal surface of the first glass plate in the thickness direction; and a sealing metal layer directly connected to the first glass plate, and connecting together the first glass plate and the cover part so as to airtightly seal an internal space of the sealing body;

a functional part spaced from the first glass plate and in the internal space of the sealing body, the functional part having a pair of electrodes;

a filling resin part that fills a space between the sealing body and the functional part; and a via conductor in a first through hole extending through the first glass plate in the thickness direction and in a second through hole extending through the filling resin part in the thickness direction and communicating with the first through hole, the via conductor being electrically connected to the pair of electrodes of the functional part, wherein a water vapor transmission rate of the cover part is less than or equal to one-tenth of a water vapor transmission rate of the filling resin part having a same film thickness, or the cover part is made of glass or metal.

2. The electronic component according to claim 1, wherein the sealing metal layer is directly connected to the side surface of the first glass plate.

3. The electronic component according to claim 1, further comprising a first adhesive layer between the filling resin part and the first glass plate.

4. The electronic component according to claim 3, wherein a Young's modulus of the first adhesive layer is lower than a Young's modulus of the first glass plate and lower than a Young's modulus of the filling resin part.

5. The electronic component according to claim 3, wherein a thickness of the first glass plate is less than or equal to 200 μm.

6. The electronic component according to claim 5, wherein a thickness of the sealing metal layer is less than or equal to 4 times the thickness of the first glass plate.

7. The electronic component according to claim 6, wherein the thickness of the sealing metal layer is less than the thickness of the first glass plate.

8. The electronic component according to claim 5, wherein the cover part is plate-shaped, and wherein a thickness of the cover part is less than or equal to 200 μm.

9. The electronic component according to claim 8, wherein the cover part is a made of glass and is plate-shaped, the electronic component further comprises a second adhesive layer between the filling resin part and the cover part, and wherein a Young's modulus of the second adhesive layer is lower than a Young's modulus of the cover part and lower than a Young's modulus of the filling resin part.

10. The electronic component according to claim 1, wherein, in the filling resin part, the second through hole is only in a region between the first glass plate and the functional part.

11. The electronic component according to claim 10, wherein, in the filling resin part, a thickness between the first glass plate and the functional part is less than a thickness of the functional part.

12. The electronic component according to claim 11, wherein, in the filling resin part, a thickness between the cover part and the functional part is less than the thickness of the functional part.

13. The electronic component according to claim 1, further comprising:

an outer-side resin part at the second principal surface of the first glass plate, wherein, a surface roughness of a second surface of the outer-side resin part on a side thereof opposite to a first surface of the outer-side resin part that contacts the first glass plate is greater than a surface roughness of the first surface of the outer-side resin part that contacts the first glass plate.

14. The electronic component according to claim 13, wherein the outer-side resin part comprises a material that is the same as a material of the filling resin part.

15. The electronic component according to claim 13, wherein a thickness of the outer-side resin part is less than a thickness of the filling resin part between the first glass plate and the functional part.

16. The electronic component according to claim 15, wherein the sealing metal layer extends from the side surface of the first plate up to the second surface of the outer-side resin part on the side thereof opposite to the first surface that contacts the first glass plate.

17. The electronic component according to claim 1, further comprising:

an outer-side resin part that at the second principal surface of the first glass plate, wherein, a surface roughness of a second surface of the outer-side resin part on a side thereof opposite to a first surface of the outer-side resin part that contacts the first glass plate is 300 nm to 3000 nm in terms of arithmetic mean roughness.

18. The electronic component according to claim 1, further comprising:

an outer-side resin part at the second principal surface of the first glass plate, wherein, a second surface of the outer-side resin part on a side thereof opposite to a first surface of the outer-side resin part that contacts the first glass plate includes a wire that is electrically connected to the via conductor, and wherein, in the second surface of the outer-side resin part on the side thereof opposite to the first surface of the outer-side resin part that contacts the first glass plate, a surface roughness of a surface where the wire is not provided is greater than a surface roughness of a surface that contacts the wire.

19. The electronic component according to claim 1, wherein the second principal surface of the first glass plate includes a wire that is electrically connected to the via conductor, and wherein a flatness of the second principal surface of the first glass plate is less than or equal to 30 nm in terms of arithmetic mean roughness.

20. The electronic component according to claim 19, wherein the sealing metal layer extends from the side surface of the first glass plate up to the second principal surface of the first glass plate.

21. The electronic component according to claim 1, wherein the via conductor includes a first via conductor in the first through hole and a second via conductor in the second through hole, wherein a central axis of the first via conductor is positioned laterally with respect to a central axis of the second via conductor, and wherein the first via conductor and the second via conductor are electrically connected to each other by a wire located at the filling resin part.

22. The electronic component according to claim 1, wherein the functional part is a capacitor.

23. The electronic component according to claim 22, wherein the functional part includes a plurality of capacitor elements.

* * * * *